United States Patent
Lee

(10) Patent No.: US 7,332,834 B2
(45) Date of Patent: Feb. 19, 2008

(54) POWER OUTLET DEVICE FOR CHARGER AND METHOD OF TRANSMITTING POWER THEREOF

(75) Inventor: Yu-Lung Lee, Taipei Hsien (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 11/518,453

(22) Filed: Sep. 11, 2006

(65) Prior Publication Data

US 2008/0007124 A1 Jan. 10, 2008

(30) Foreign Application Priority Data

Jul. 4, 2006 (TW) ............... 95124406 A

(51) Int. Cl.
*H01H 35/00* (2006.01)
(52) U.S. Cl. ..................... 307/131
(58) Field of Classification Search ............... 307/131
See application file for complete search history.

(56) References Cited

U.S. PATENT DOCUMENTS 6,367,024 B1 * 4/2002 Ezell ..................... 713/340
2001/0038339 A1 * 11/2001 McKenzie et al. ..... 340/825.36
2002/0195880 A1 * 12/2002 Bij De Leij ................. 307/115
2004/0164621 A1 * 8/2004 Fu et al. ..................... 307/117
2007/0038334 A1 * 2/2007 Chou et al. ................. 700/292

FOREIGN PATENT DOCUMENTS

JP 2005276595 A * 10/2005

* cited by examiner

*Primary Examiner*—Michael Sherry
*Assistant Examiner*—Daniel Cavallari
(74) *Attorney, Agent, or Firm*—Rosenberg, Klein & Lee

(57) ABSTRACT

A power outlet device for a charger comprises an input port, a DC power supply unit, a control unit, a current sensor, a switch, and an output port. The input port of the power outlet device for a charger is used to receive an AC power, and the current sensor and the switch are controlled by the control unit to output the AC power from the output port. Wherein the control unit monitors and controls the current value according to the current sensor and the switch to determine transmission of the AC power so as to effectively manage power and save energy.

11 Claims, 2 Drawing Sheets

POWER OUTLET DEVICE FOR CHARGER AND METHOD OF TRANSMITTING POWER THEREOF

BACKGROUND OF THE INVENTION

1. Field of the Invention

The present invention relates to a power outlet device for a charger and a method of transmitting power thereof, and more particularly to the power outlet device for a charger with energy saving control and a method of transmitting power thereof.

2. Description of the Prior Art

In our common life, it is not difficult to see that a power outlet is filled up by electric equipment, even if some of the electric equipment is not used. In other words, the users consider that if only the electric equipment don't be turned on and even if it is inserted in the power outlet that it doesn't consume power. That is an incorrect concept.

However, the electric equipment is inserted in the power outlet even if it doesn't use, that it still produces slight currents and consumes power. And over a long period, it will cause considerable energy consumption.

The inventor of the present invention recognizes the above shortage should be corrected and special effort has been paid to research this field. The present invention is presented with reasonable design and good effect to resolve the above problems.

SUMMARY OF THE INVENTION

It is a primary object of the present invention to provide a power outlet device for a charger is to effectively manage power and save energy, i.e. when the charged device connected with the output port of the power outlet device doesn't work, it doesn't consume power.

To achieve the primary objective stated above, the power outlet device for a charger comprises an input port for receiving an AC power; a DC power supply unit which is connected with the input port for converting the AC power into a DC power; a current sensor for detecting magnitude of current of the AC power; a switch for controlling transmission of the AC power; a control unit which is connected with the DC power supply unit for receiving the DC power for controlling the current sensor and the switch; and an output port which is connected with the switch for outputting the AC power.

To achieve the primary objective stated above, a method of transmitting power of a power outlet device comprises the steps of: First, receiving an AC power; and next, turning on a switch for detecting current and recording a first current value; and next, switching regularly the switch for detecting a second current value; and next, keeping the switch in ON status and continuing to detect the second current value if the second current value being greater than the first current value; and turning off the switch to cut the AC power if the second current value being close to the first current value.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
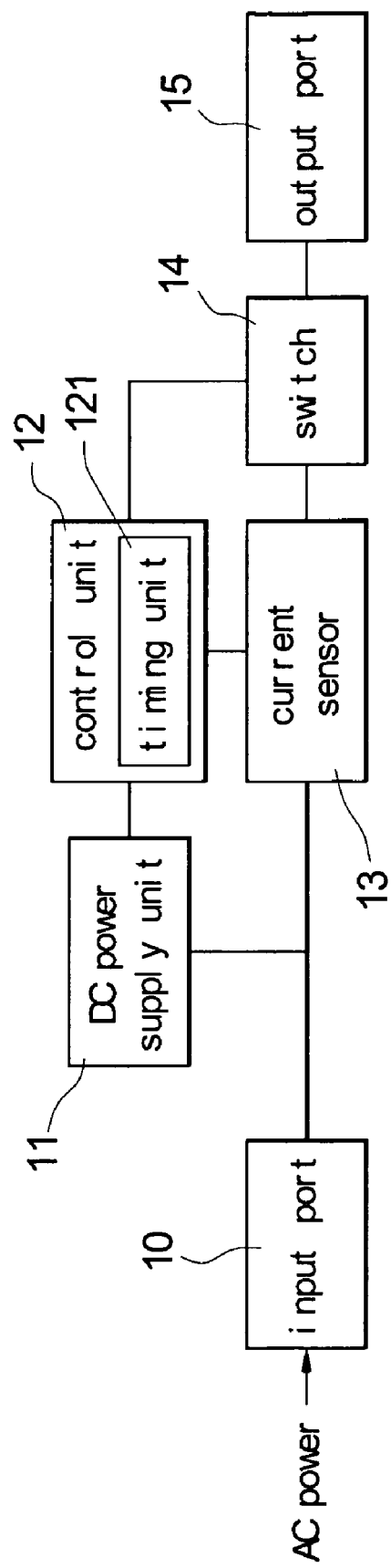
FIG. 1 is a functional block diagram of a power outlet device for a charger according to the present invention.

Reference is shown in FIG. 1. It is a functional block diagram of a power outlet device for a charger according to the present invention. The power outlet device comprises an input port 10, a DC power supply unit 11, a control unit 12, a current sensor 13, a switch 14, and an output port 15. During operation of the power outlet device, an AC power is received by the input port 10 and outputted by the output port 15. The AC power is transmitted to the current sensor 13, the switch 14, and the output port 15, and converted into the DC power for supplying to the control unit 12. The switch 14 is switched regularly by the control unit 12 according to a timing unit 121, and the current sensor 13 detects magnitude of current of the AC power transmitted from the output port 10.

Furthermore, the output port 10 can be a socket element for receiving the AC power. For example, an input port of the plug element is inserted into a utility power outlet for receiving a 110/220 AC power. Besides, the output port 15 can be also a socket element or an output port for a charger for outputting an AC power. And the AC power outputted is supplied by switching the switch 14 by the control unit 12 according to electricity consumed condition for saving energy.

Figure 2:
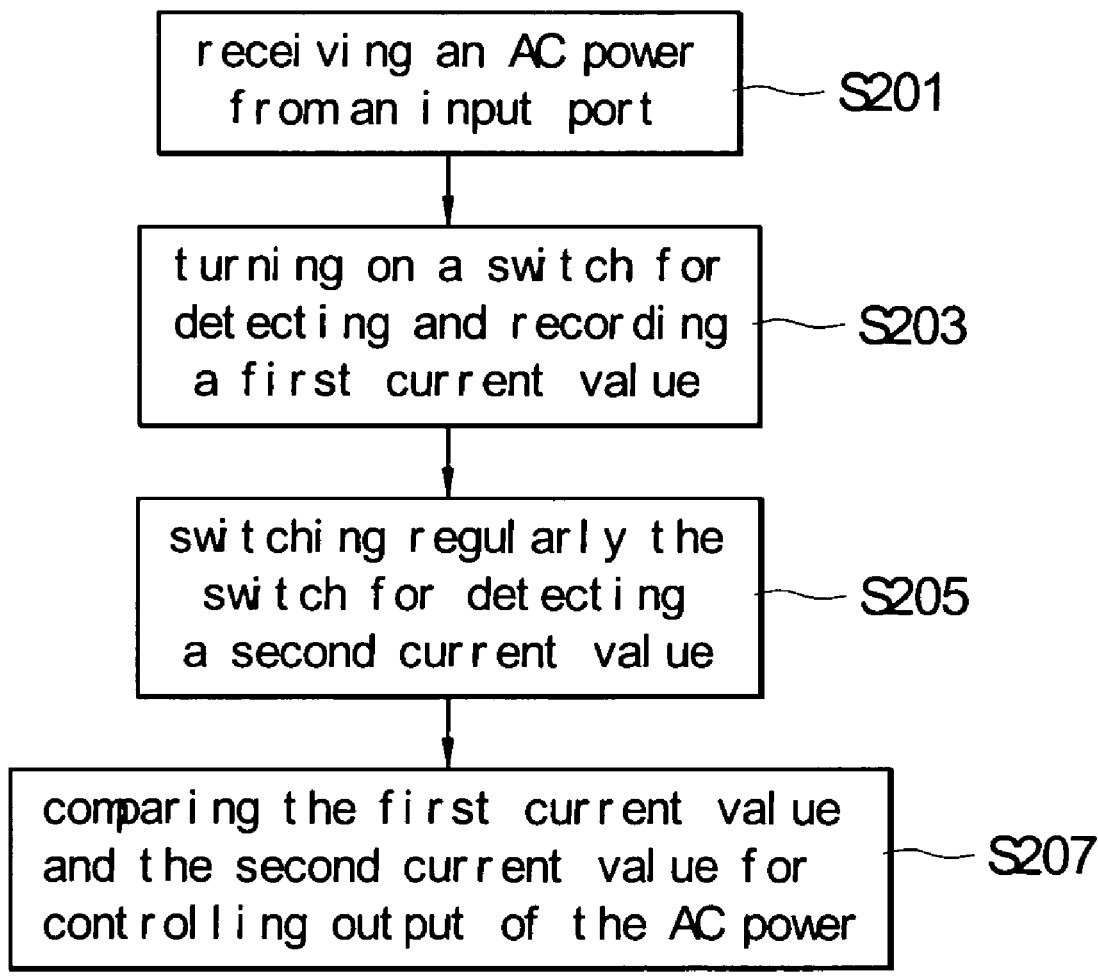
FIG. 2 is a flowchart of a method of a power outlet device transmitting power according to the present invention.

Reference is shown in FIG. 2. It is a flowchart of a method of a power outlet device transmitting power according to the present invention. First, an AC power is received from an input port 10 (S201). And next, a DC power supply unit 11 converts the AC power into a DC power and supplies to a control unit 12. The control unit 12 turns on a switch 14 and fetches a current value passed from the input port 10 by a current sensor 13, and records constantly the current value until the current value is the smallest value during a period of time and regards the smallest value as a first current value (S203). And next, the control unit 12 controls the switch 14 according to a time signal provided by a timing unit 121 to switch regularly the switch 14 in ON status or in OFF status so as to detect a second current value via the current sensor 13 when the switch 14 turned on (S205). After the second current value fetched, the control unit 12 compares the first current value and the second current value to control the switch 14 so as to control the AC power supplied from the input port 10 (S207). When the control unit 12 turns on the switch 14 according to the timing unit 121 and fetches the second current: if the second current value is greater than the first current value, that means the charger connected with the output port 15 uses the AC power provided by the input port 10 for charging, the control unit 12 keeps the switch 14 in ON status and the current sensor 13 continues to detect the second current value at the same time; if the second current value is close to the first current value, that means the charger connected with the output port 15 doesn't use the AC power provided by the input port 10 for without charging, the control unit 12 turns off the switch 14 to cut the AC power transmitted to the output port 15 so as to save energy. Furthermore, the control unit 12 continues to control the switch 14 according to the timing unit 121 to detect the second current value.

Whereby the above-mentioned device and method to determine use condition of the AC power as that the AC power supplied to the output port when the charged device connected with the output port is operated to effectively manage power and save energy.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power outlet device for a charger, comprising:
    an input port for receiving an AC power;
    a DC power supply unit connected with the input port for converting the AC power into a DC power;
    a current sensor for detecting magnitude of current of the AC power;
    a switch for controlling transmission of the AC power;
    a control unit connected to the DC power supply unit for receiving the DC power for controlling the current sensor and the switch, wherein the control unit has a timing unit disposed therein and the switch is periodically activated by the control unit to turn on and turn off in a repeated sequence according to a signal provided by the timing unit; and
    an output port connected with the switch for outputting the AC power.

2. The power outlet device for a charger as claimed in claim 1, wherein the input port is a plug element.

3. The power outlet device for a charger as claimed in claim 1, wherein the output port is a socket element.

4. The power outlet device for a charger as claimed in claim 1, wherein the output port is an output port for connecting a charging device.

5. A method of transmitting power of a power outlet device, comprising the steps of:
    connecting the power outlet device to a source of AC power;
    turning on a switch to thereby provide electrical power to an outlet port for a predetermined period of time to detect and record a first current value;
    switching on and off the switch in a repeated sequence for detecting a second current value;
    comparing the first current value and the second current value;
    maintaining the switch in an ON status and continuing to detect the second current value if the second current value is greater than the first current value; and
    turning off the switch to cut off the AC power to the outlet port if the second current value is close to the first current value.

6. The method of transmitting power of a power outlet device as claimed in claim 5, wherein the AC power is received by an input port having a plug element.

7. The method of transmitting power of a power outlet device as claimed in claim 5, wherein the switch is controlled by a control unit.

8. The method of transmitting power of a power outlet device as claimed in claim 5, wherein the first current value and the second current value are measured by a current sensor.

9. The method of transmitting power of a power outlet device as claimed in claim 5, further comprising outputting the AC power by an output port having at least one electrical receptacle.

10. The method of transmitting power of a power outlet device as claimed in claim 5, further comprising outputting the AC power by an output port for connecting to a charger.

11. The method of transmitting power of a power outlet device as claimed in claim 5, wherein the first current value is a minimum value of the detected current.

* * * * *